Figure 1:
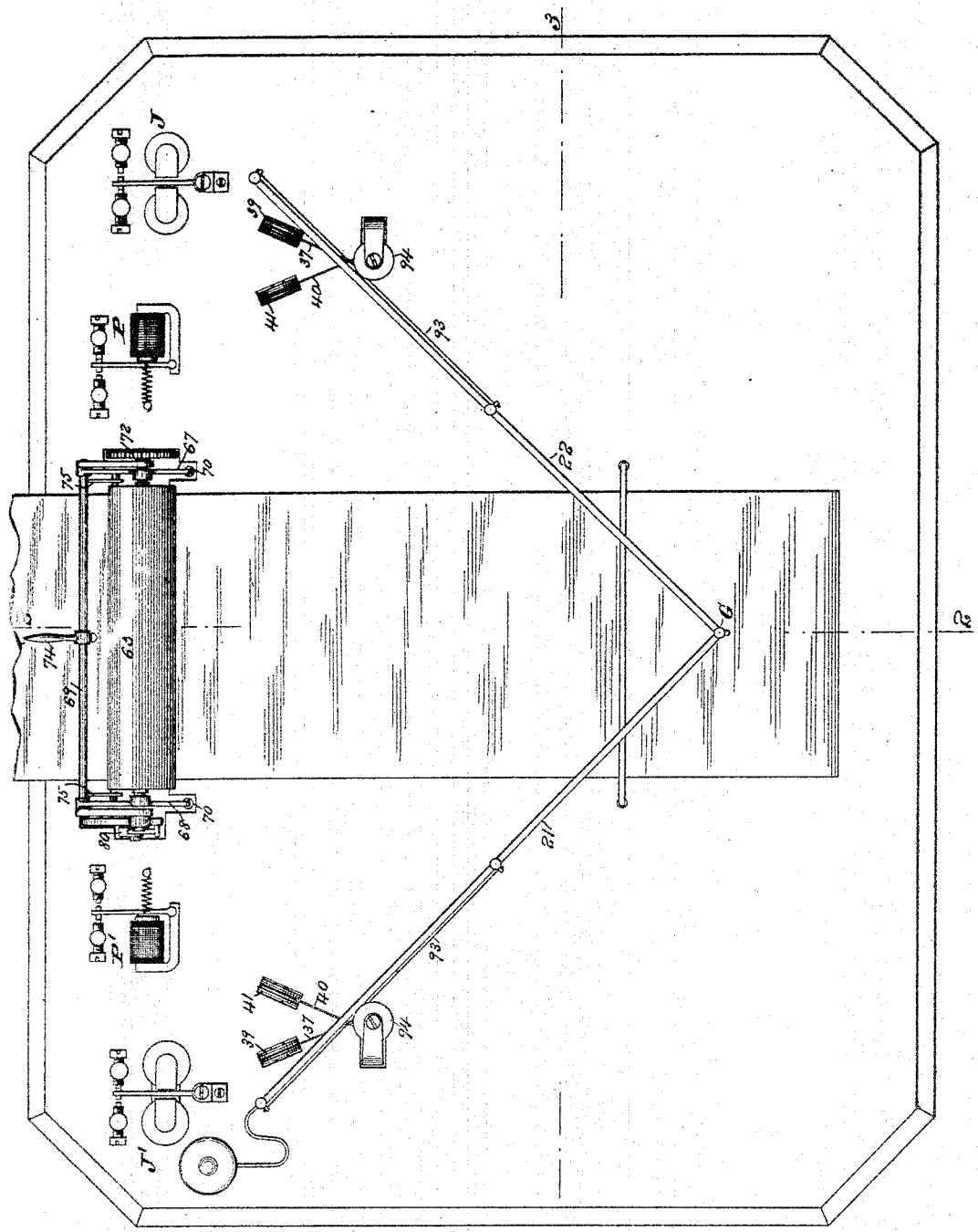

(No Model.) 3 Sheets—Sheet 1.

E. GRAY.
TELAUTOGRAPH.

No. 491,347. Patented Feb. 7, 1893.

Attest:
Geo. H. Bott
G. W. Boost

Inventor:
Elisha Gray
by Philipp Munson & Phelps
Attys (No Model.)
E. GRAY.
TELAUTOGRAPH.
No. 491,347. Patented Feb. 7, 1893.
8 Sheets—Sheet 2.
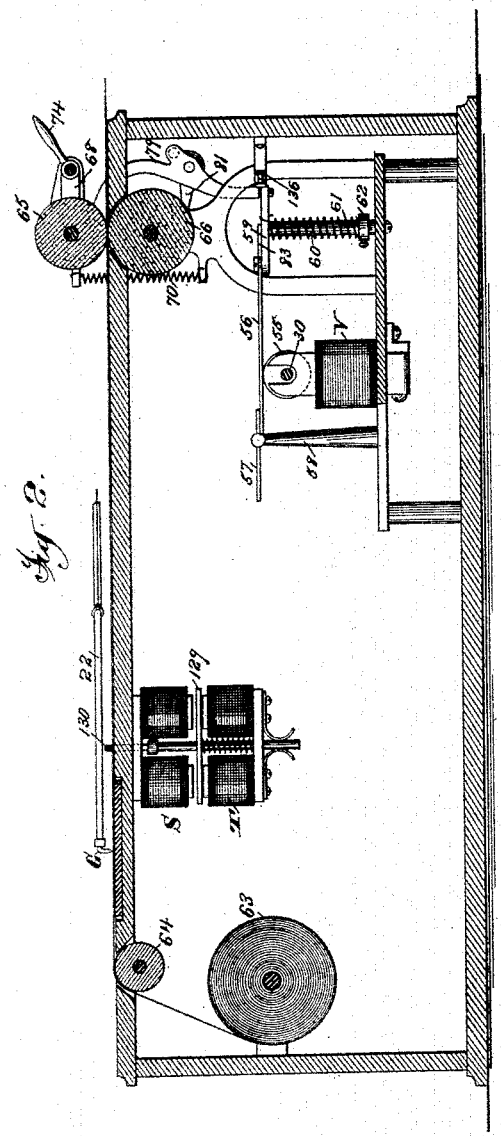
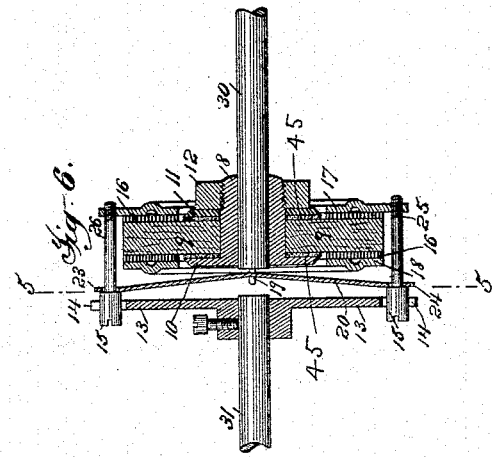
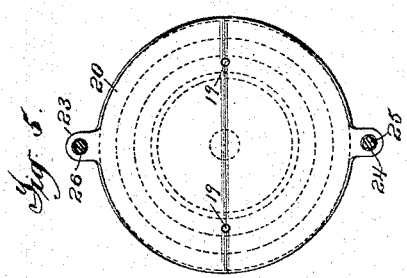
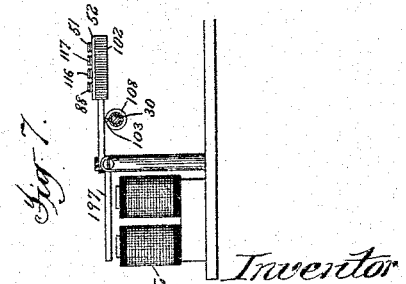
Attest
Geo. H. Botts.
G. M. Borst.
Inventor
Elisha Gray
by
Philipp Munson & Phelps
Attys (No Model.) 8 Sheets—Sheet 3.
E. GRAY.
TELAUTOGRAPH.
No. 491,347. Patented Feb. 7, 1893.
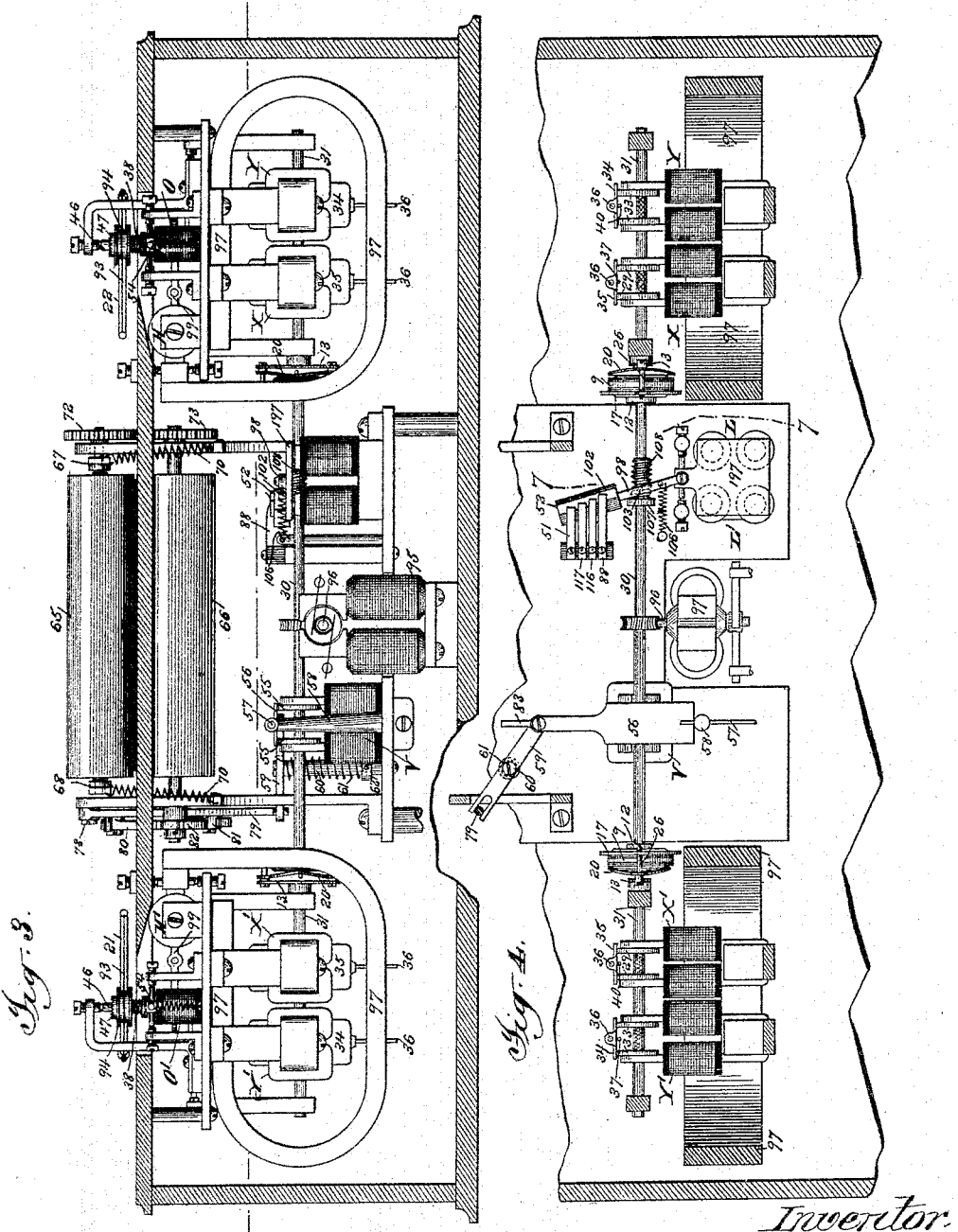

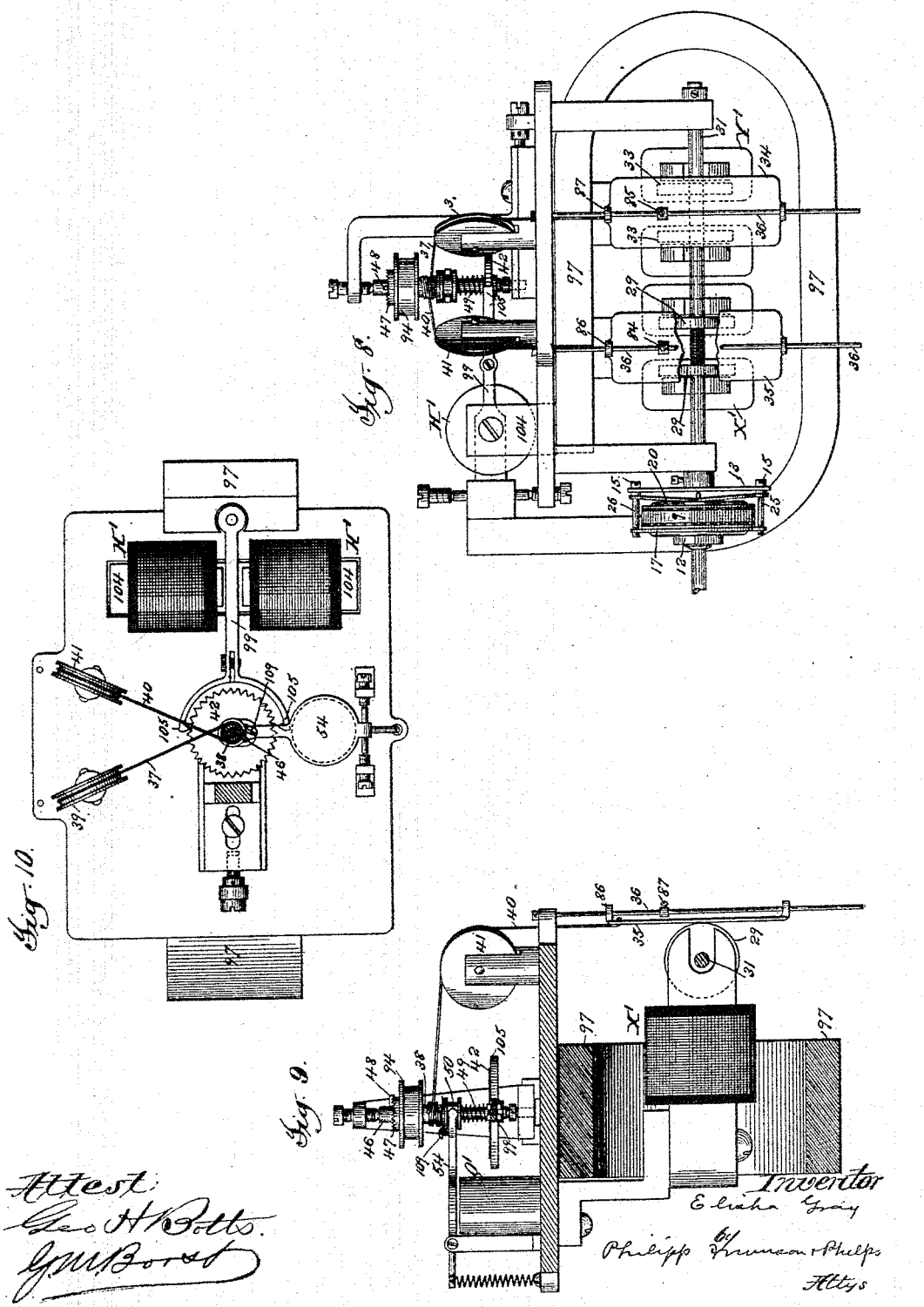

(No Model.)  8 Sheets—Sheet 5.
E. GRAY.
TELAUTOGRAPH.
No. 491,347.  Patented Feb. 7, 1893.
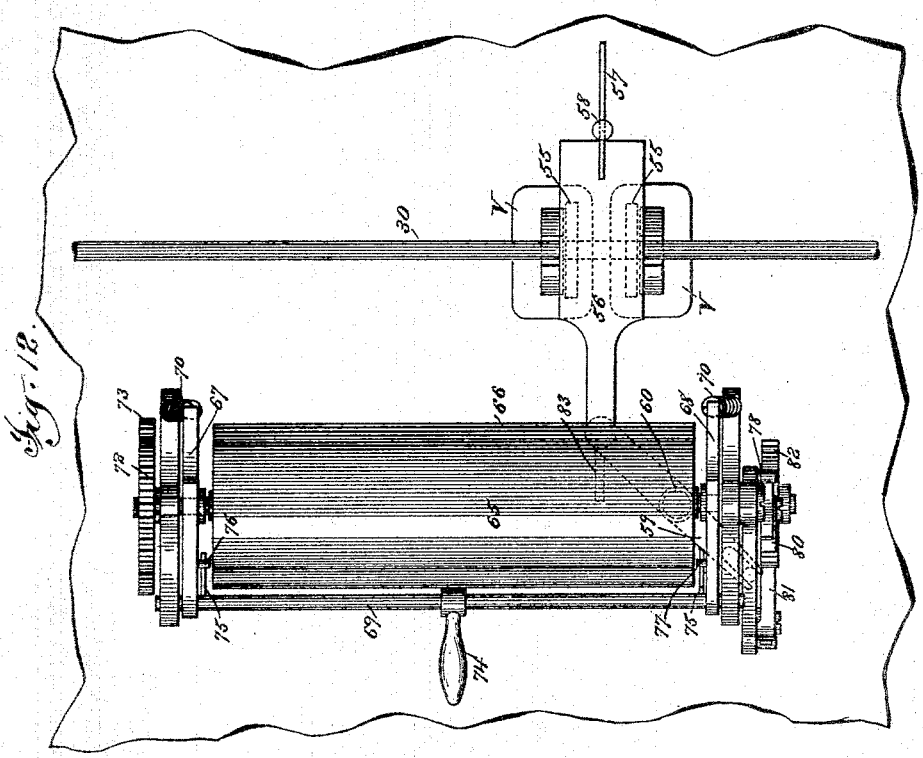
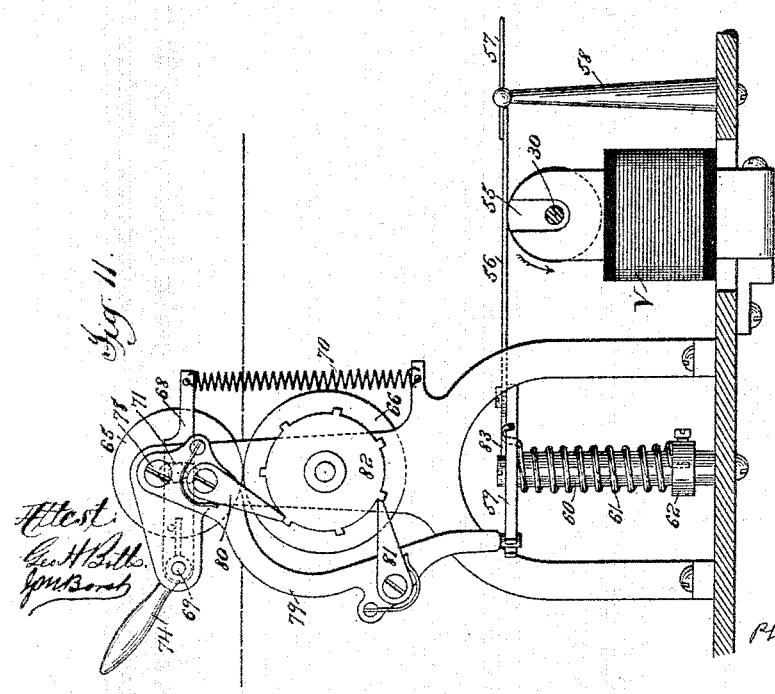

(No Model.)  8 Sheets—Sheet 6.
E. GRAY.
TELAUTOGRAPH.
No. 491,347. Patented Feb. 7, 1893.
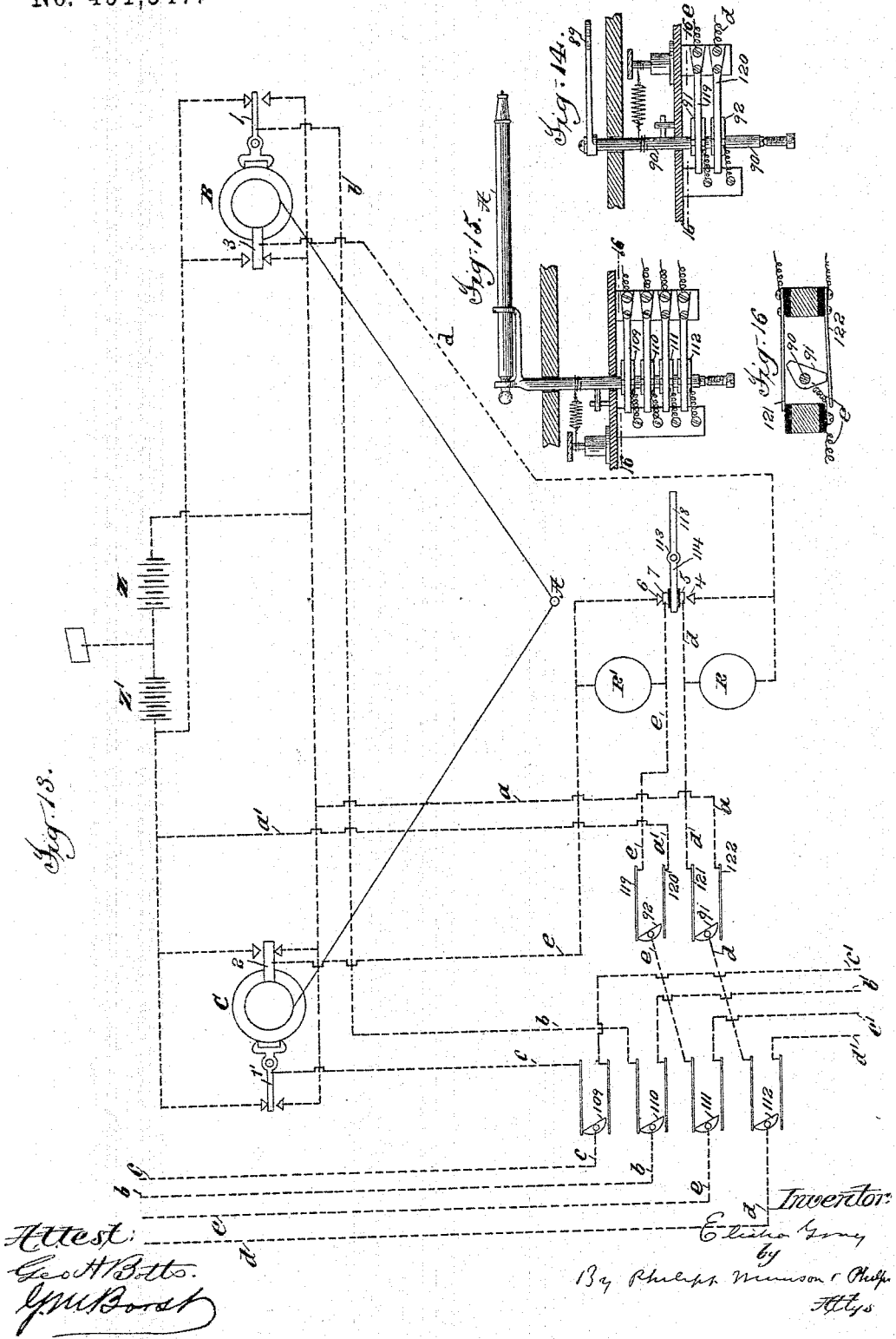

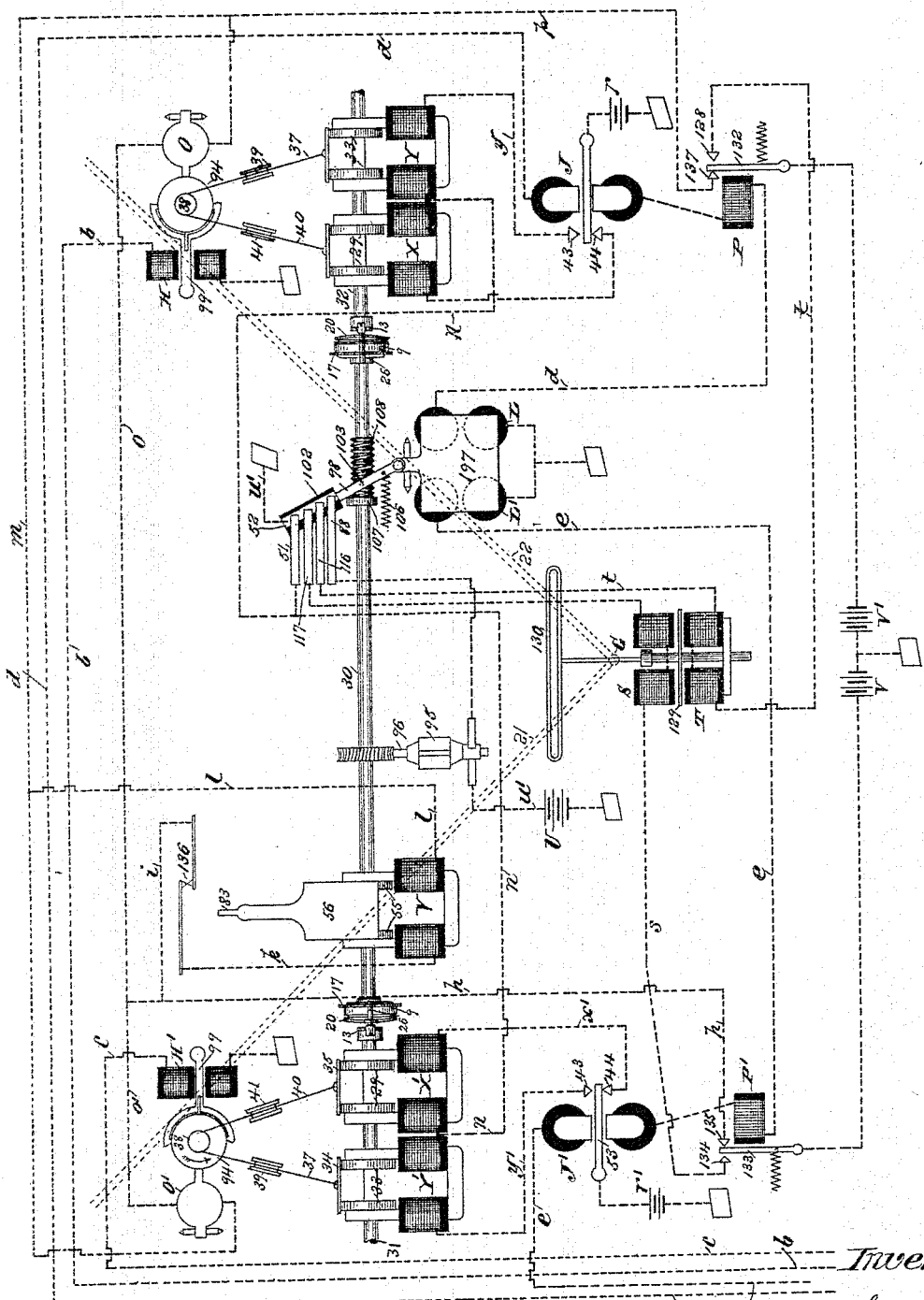

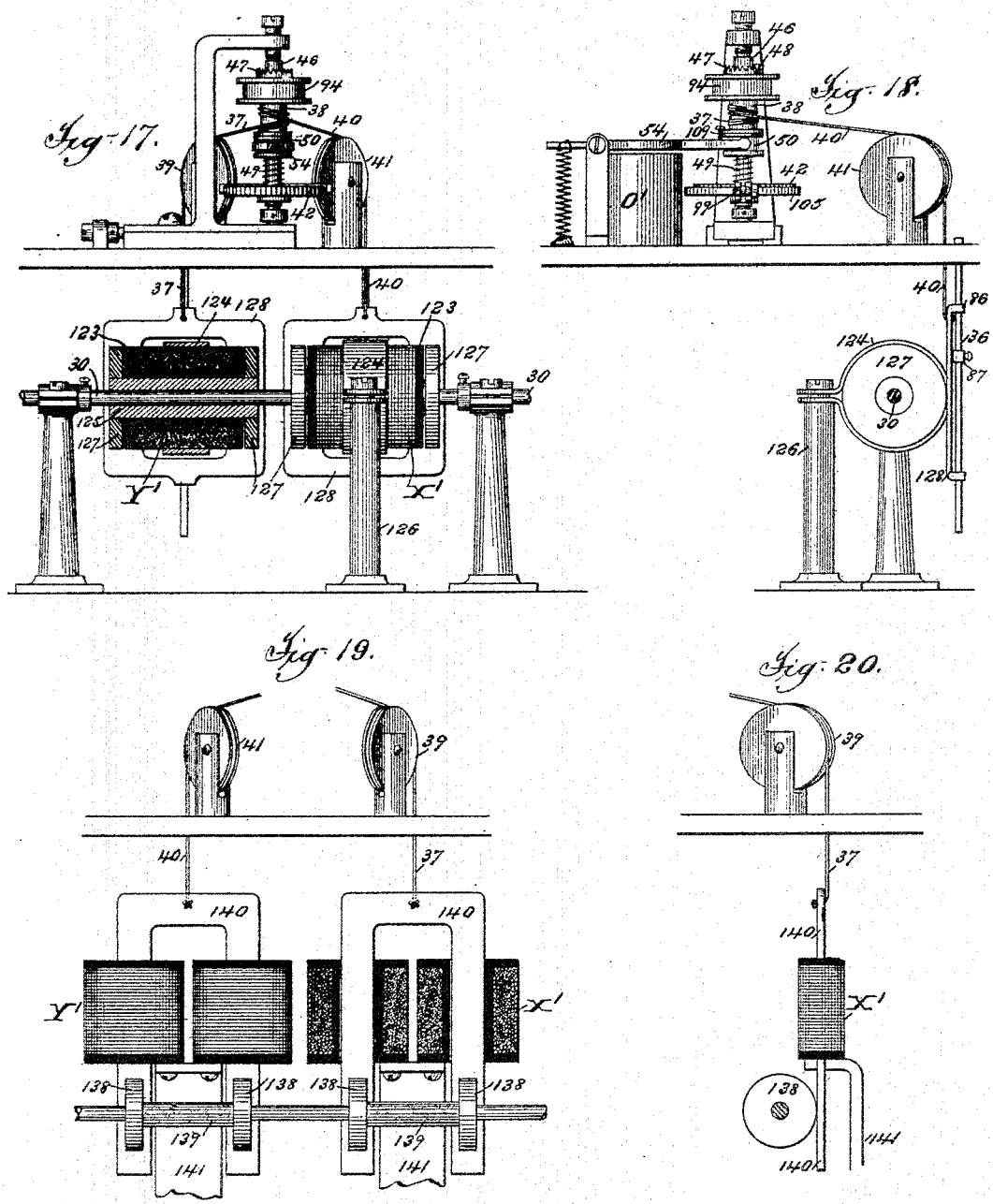

UNITED STATES PATENT OFFICE.

ELISHA GRAY, OF HIGHLAND PARK, ILLINOIS.

TELAUTOGRAPH.

SPECIFICATION forming part of Letters Patent No. 491,347, dated February 7, 1893.

Application filed September 21, 1892. Serial No. 446,430. (No model.)

*To all whom it may concern:*

Be it known that I, ELISHA GRAY, a citizen of the United States, residing at Highland Park, county of Lake, and State of Illinois, have invented certain new and useful Improvements in Telautographs, fully described and represented in the following specification and the accompanying drawings, forming a part of the same.

This invention relates to a writing telegraph of that class in which the act of writing the message at the sending station operates to reproduce it at the receiving station, and it is in the main an improvement upon the apparatus and organization described in my former patents, particularly Nos. 461,470 and 461,472.

One of the objects of my present invention is to simplify and improve the mechanism described in said patents for giving movement to, and reversing the movement of, the receiving pen.

Another object of my present invention is to improve and simplify the paper feeding mechanism, providing improved means for giving a positive feed to the paper strip at the feeding station.

My invention further consists in other features and in details of construction and organization, which will be best understood by reference to the accompanying drawings, in which—

Figure 1 is a plan view of the table carrying the receiving instrument. Fig. 2 is a vertical section on or near the line 2—2 of Fig. 1, showing the paper shifting mechanism and the pen lifter magnets. Fig. 3 is a vertical section on the line 3—3 of Fig. 1, showing in elevation the motor, the paper rolls, the paper feeding mechanism, the reversing mechanism and the motor cut out switch. Fig. 4 is a sectional plan view on the line 4—4 of Fig. 3, showing the same parts, with the exception of the paper rolls, in plan. Figs. 5 and 6 are views on an enlarged scale of a frictional power regulating device located between sections of the motor shaft, whereby the amount of power transmitted to the receiving pen is determined and regulated; Fig. 5 being a section on the line 5—5 of Fig. 6. Fig. 7 is a sectional elevation on about the line 7—7 of Fig. 4, of the motor cut out magnet and connected devices. Fig. 8 is a vertical rear elevation of half of the reversing mechanism, to wit, that shown on the left hand side of Fig. 3. Fig. 9 is a sectional side elevation of the same, the point of view being to the left of Fig. 3. Fig. 10 is a plan view of the escapement governing the movement of the receiving pen and its magnet, these three figures also being on an enlarged scale. Figs. 11 and 12 are respectively side and plan views of the paper feed mechanism also on an enlarged scale. Figs. 13 and 13ª show together the circuit connections at a transmitting and receiving instrument respectively. Figs. 14 and 15 are details respectively of a form of unison and pen rack switch which may be employed; Fig. 16 being a section on either of the lines 16—16 of Figs. 14 and 15. Figs. 17 and 18 are front and side views respectively of a modified form of my improved magnetic clutch for the reversing mechanism. Figs. 19 and 20 are similar views of another modification of the same.

My present invention, as above stated, relates principally to the construction and organization of the receiver.

It will be understood that the transmitter resembles in general organization that shown in my above mentioned patent No. 461,472 and it will therefore be unnecessary for me to describe the same in detail except so far as it embodies new matter. The particular form of interrupter at the transmitter herein described is one of the forms shown in my pending application, Serial No. 417,365, filed January 8, 1892. Of course it will be understood that any other form of transmitting instrument, or any other organization of circuits adapted to govern the movement of a receiving pen from a transmitting station, might be substituted for those shown without affecting the structure or operation of the principal features of the receiving instrument. The main line circuit *b* passes from earth through one or the other of batteries Z, Z' having opposite poles to line, according to the position of the vibrating lever 1 forming part of the interrupter B, through the pen rack switch to the distant station, and this circuit receives and transmits pulsations of successively alternate polarity as the lever 1 vibrates in accordance with movements of the transmitting pen to and from the interrupter B.

Likewise the main line circuit *c* passes through one or the other of the same batteries Z, Z' according to the position of the vibrating lever 1' forming part of the interrupter C, to the pen rack switch and thence to the distant station, and receives pulsations of successively opposite polarity in accordance with the movement of the transmitting pen to and from the interrupter C. The reversing circuit *d* passes through one or the other of batteries Z, Z', according to the position of the circuit reversing arm 3, thence through the resistance R or around it through the contact points 4 and 5, according to the position of the transmitting pen, thence to the unison switch thence to the pen rack switch and thence to line. Likewise the circuit *e* passes through one or the other of batteries Z, Z' according to the position of the circuit reversing arm 2, thence through resistance R' or around it through contacts 6 and 7 depending upon the position of the transmitting pen, thence to the unison switch, thence to the pen rack switch and thence to line. It will be understood that the circuit reversing arms 2 and 3 are identical with the arms 86 performing a similar function in the apparatus of my said patent No. 461,472.

In the above description of circuits it has been assumed that the transmitting instrument is connected with the distant receiving instrument. Of course if the pen rack switch were so set as to connect the transmitting instrument with the receiving instrument at the home station, thus adapting the instrument to receive a message, the connections would be made through the pen rack switch to the wires *d'*, *e'* respectively. It will of course be understood that as in my former patents the transmitting pen is to be understood to be a pen or pencil or other writing instrument or a simple handle of convenient form, all of these things being included under the term "pen."

In writing the operator takes the pen A in his hand and forms the characters in the usual manner. As the pen makes the down strokes pulsations of successively opposite polarity will be sent over each of the main line circuits *b* and *c* by the operation of the interrupters B and C respectively, and a positive current from battery Z' will reverse each of the circuits *d* and *e*. While the transmitting pen is making the up stroke similar pulsations will traverse the main line circuits *b*, *c* through the action of the interrupters B and C and a negative current from battery Z will traverse both the circuits *d*, *e*. The polarity of the current in the reversing circuit *d* will therefore be reversed as often as a reversal occurs in the direction of movement of the transmitting pen with reference to the interrupter B and the polarity of the current traversing the reversing circuit *e* will be reversed as often as the direction of movement of the transmitting pen with reference to the interrupter C occurs.

The receiving instrument will now be described. The receiving pen G is, as heretofore in my patents, a writing instrument of any suitable form adapted to record a message. As shown herein it is a fountain pen connected by a flexible tube of capillary bore with an ink reservoir, as described in my said patents. The pen arms 21, 22, are, as usual, attached flexibly or jointedly with the pen and are each provided with a cord 93 having a turn about a drum 94. Motion is given to the receiving pen by the revolution of these drums 94 and this revolution is effected in correspondence with the movements of the transmitting pen by means of the mechanism about to be described.

The revolution of the drums to move the receiving pen is effected in my present organization by power derived from a motor 95, and the application of the power of the motor to the pen drums is controlled by reversible escapements, governed by the pulsations sent over the lines as above described. The motor may be of any suitable construction, the form which I prefer and that shown in this application being an electric motor. The shaft 96 of this motor is geared to a shaft 30 from which both of the pen drums 94 receive their motion. The shaft 30 is suitably trunnioned or journaled so as to revolve freely and is provided with two frictional power regulators, the form of which herein shown, to which, however, I do not confine myself being that of friction clutches acting mechanically, as distinguished from action dependent upon magnetic attraction. One of these power regulators is placed on each side of the motor and through it the power of the motor is transmitted to the two pen drums respectively and by it the power transmitted is regulated and limited to a substantially constant portion of the power of the motor. These regulators are shown in detail in Figs. 5 and 6, Fig. 6 being a vertical sectional view. Each consists of a hub 8 which is keyed rigidly to the shaft 30 and may be of brass. To this hub is clamped a disk 9 of glass or equivalent material held between flange 10 of hub 8 and a washer 11 held in place by nut 12; the glass disk being preferably provided on each side with a gasket 45 of pliable material as rubber. The glass disk is thus made rigid with the shaft 30 and constitutes one member of the frictional power transmitting device. The other member consists of a frictional pad 16 secured to the shaft 31, which shaft is in line with the shaft 30. The pads shown consist of annular pieces of felt, chamois skin or similar material bearing respectively upon the two faces of the disk 9, each pad being of annular form and cemented or otherwise fastened to one of the two annular metal plates 17, 18, ribbed to stiffen them. The plate 18 is provided with two pins 19 diametrically opposite each other, and these pins pass through holes in a spring metal plate 20 of circular form and slightly bent at the line of the holes. This plate is provided with ears 23, 24 on a line perpendicular to a line connecting the pins 19. These ears are perforated and through them are passed small screw bolts 25 26, each provided with a head 15 which rests against one face of the lug or ear through which it passes and the other with a screw thread engaging with an ear suitably placed to receive it upon the plate 17.

To the shaft 31 is rigidly attached a two-armed piece 13, each of the arms of which is provided at its end with a slot 14 each of which slots receives the head 15 of one of the bolts 25, 26. It results in this construction that the pressure of the friction pads 16 upon the faces of the disk 9 is regulated by the tension of the spring 20, which tension is determined by the extent to which the bolts 25, 26 are screwed into the ears upon the plate 17. It results from this construction that when the friction pads 16 are clamped upon the glass disk 9, shaft 31 will rotate with the shaft 30 unless the resistance against the rotation of the shaft 31 is greater than the frictional adhesion between the friction pads, and the glass disk in which case the shaft 31 will be stopped. By adjusting the pressure of the pads upon the disk the amount of power which can be passed from the shaft 30 to the shaft 31 can be delicately regulated. The power of the shaft 31 is used to transmit driving force to move the receiving pen in one of two intersecting lines of motion. At the other end of the motor shaft 30 is another power regulating device, and beyond it a third shaft 32, through which power is transmitted to drive the receiving pen in the other of the two intersecting lines of movement. The construction of the parts connected with each of the shafts 31, 32 is identical and the description of those connected with shaft 31 which will be given may therefore be understood as applying also to those connected with shaft 32. The shaft 31 carries two pairs of soft iron disks 29, and 33, rigidly mounted thereon. The shaft itself may be of iron or steel, or non-magnetizable material as brass. If the shaft be of magnetizable material those portions thereof between each of the pairs of disks are made of non-magnetic material. Each pair of disks corresponds to one of two magnets X', Y', each having two coils and a horse-shoe shaped core, the ends of the core being slotted and placed so as to embrace the shaft 31, one on each side of each pair of disks close to but not in contact therewith. The magnetic circuit of each of these magnets is made through the disks and an armature in frictional contact therewith, the armatures consisting of two soft iron plates, respectively 34 and 35 placed tangentially to the disks and having a movement of rectilinear reciprocation. These plates are guided on a rod 36 so as to slide vertically. To the plate 34 is connected a cord 37 which passes over a pulley 39 and several times around the drum 38 of the pen drum and is then attached thereto. To the armature 35 is attached a cord 40 passing over the idle pulley 41, several times about the drum 38 and is then attached thereto; or in place of the two cords 37, 40, a single cord may be used, wrapped several times about the drum 38.

It will be observed that the true position of the drum 94 with reference to the armatures 34, 35 and the cords is shown in Figs. 1, 3, 8, 9 and 10. In the diagram Fig. 13ª it is shown for the sake of clearness as on the opposite side of shaft 31 from magnets X', Y', whereas in fact it is on the same side as, and above, these magnets. The drum 38 by which the cords 37, 40 are attached is rigid with the pen drum 94. The latter drum is connected with the escape wheel 42 through a clutch, one member of which is the V-toothed crown 47 and the other the pin 48 fixed in the trunnion shaft 46 having upon it an escapement wheel 42. The pallets 105 of this escapement wheel are attached to the armature of a magnet H' (the corresponding magnet on the other side of the machine being designated H). The angles of the faces of the escapement pallets 105, as well as those of the faces of the escape wheel teeth, are preferably cut the same and so that the escapement will be reversible and operate in either direction with equal facility upon the reversal of the strain which tends to move it. This magnet is a polarized relay of any suitable construction. In that shown the polarization is effected by permanent magnet 97, one end of which is attached to the iron yoke 104 which connects the cores of the two magnet coils, and the other end embraces in close proximity the rear end of the armature 99 trunnioned in the framework. The two members of the clutch 47, 48 are held together by the pressure of the spring 49, one end of which bears against the hub of the escape wheel and the other against a loose grooved collar 50 which in turn bears against the lower end of the drum 38. So long as the pressure of the spring 49 acts upon the collar 50 and crowds it against the drum 38 the toothed crown 47 will be pressed against the pin 48 and thereby the drums 38, 94 will be rigidly fastened to the shaft 46, and by it are made rigid with the escape wheel, so that the strain transmitted from the armatures 34, 35 acting upon the drum 38 will be held in restraint by escape wheel.

Fitted to the groove in the collar 50 is a forked extension of an armature 54 trunnioned in the ordinary manner in proximity to a magnet O' (the corresponding magnet on the opposite side of the machine being lettered O). When this magnet is energized it pulls down the armature 54 and thereby withdraws the collar 50 from contact with the drum 38, permitting the members 47, 48 of the clutch to separate and disconnecting the escapement, permitting, as will be hereinafter pointed out more particularly, the receiving pen to run to unison with the transmitting pen. In order to positively pull down the drum 38 and thus open the clutch, a screw 109 may be placed upon the armature extension 54 so that its head will engage with the flange of the drum 38 when the armature of magnet O' is drawn up.

The electrical connections of the magnets X, Y, X', Y', are as follows. In each of the reversing circuits $d$, $e$ is one of two polarized relays J, J', the armature of which vibrates between stops 43, 44 and serves as a switch to direct the current of a local battery $r$ or $r'$ into one or the other of two local circuits and thus control the action of the reversing mechanism. The stop 43 is connected by a wire $y'$ with one end of the coil of magnet Y', the other end of the coil of this magnet being connected by wire $n$ to a spring 51 resting upon a grounded cut-out plate 52, the purpose of which will be hereinafter described. From the stop 44 the wire $x'$ leads to one end of the coil of magnet X' and the other end of the same coil is connected with the wire $n$. When the current passing through the magnet J' is such that its armature 53 is held against the stop 43 it will be seen that the current of battery $r'$ traverses the coils of magnets Y' and thereby causes magnetism to be excited in the disks 33, causing them in turn to attract the armature 34 and carry it downward as they rotate, throwing a tension upon the cord 37 and giving the drum 38 to which the cord is fastened, a tendency to rotate in the direction of the arrow. This tendency will be resisted by the engagement of the escapement pallets 105 with the teeth of the escape wheel 42 except as revolution is permitted by the pulsations sent over line through the main circuit $c$ which traverses the coils of magnet H'. Each pulsation will cause the escape pallet to vibrate and permit the drum to rotate a distance corresponding to one-half a tooth of the escape wheel. Meanwhile the revolution of the drum 38 has wound up the cord 40 and lifted more or less, according to the extent of its revolution, armature 35. The armature 34 will continue to be drawn down and the drum 38 will continue to revolve in the direction of the arrow until reversal occurs in the polarity of the current upon the reversing circuit $e$, and consequently a change in the position of the armature 53 of the magnet J'. When this change occurs the current of battery $r'$ will be shifted to the circuit $x'$ and will pass through magnet X'. Armature 34 will now be released by its disks 33 and armature 35 will be gripped by its disks 29, releasing the tension upon the cord 37 and creating a tension upon cord 40, thus giving the drum 38 a tendency to revolve in a direction opposite to that indicated by the arrow.

The operation of the mechanism thus far described will now be stated:—The motor shaft 30 being continuously in rotation while a message is being transmitted, gives constant rotation to the shafts 31, 32. When one or the other of the magnets X', Y' is energized it causes a downward pull upon the cord attached to its armature, placing the pen drum 94 under tension to revolve in one direction or the other. This tendency to revolve will, however, be held in restraint when the line current is on by the engagement of the escapement pallets 105 with the teeth of the escape wheel 42, except when the armature 99 carrying the pallets oscillates. The pulsations of successively opposite polarity sent to line from the transmitter cause a change of magnetic polarity in the pole pieces within the two coils of the magnet H', causing the armature 99 to be drawn first to one side and then to the other sustaining the restraint upon the receiving pen at regular successive intervals and permitting the escape wheel to revolve step by step, one step at each pulsation, in the direction in which the constant strain impels it. When a reversal occurs in the direction of motion of the transmitting pen the polarity of the current in the reversing circuit is changed, the armature of the magnet J' responds to this change, and the electrical condition of magnets X' Y' is reversed, so that the pen drum is given a tendency to reverse its direction of revolution and the direction of movement which it imparts to the pen carrying arm 21, and the motion in this reverse direction will continue until another reversal of polarity occurs in the reversing circuit. The main circuit $b$ being also provided with a polarized magnet H similar to the magnet H' and the reversing circuit $d$ being provided with a magnet J similar to J' and other connections and mechanism similar to those above described, the effect of the ordinary pulsations on the main line $b$ and reversal of current upon the reversing circuit $d$, upon the pen carrying arm 22 operated from the other pen arm 94, is the same as that which has just been described with reference to the main line $c$ and reversing circuit $e$ and pen carrying arm 21. It will now be seen that, as in the apparatus described in my above mentioned former patents, a movement of the transmitting pen in a direction to or from either of the interrupters B, C will cause the receiving pen to move in the same direction, the movement of the latter pen being made up of a series of short steps; and that the movement of the transmitting pen in a direction intermediate between these two directions will cause the receiving pen to move in a corresponding direction, but with a movement made up of a number of steps taken at right angles to, or cross wise of, each other, the relative number of steps in each direction depending upon the obliquity of the movement of the transmitting pen.

The mechanism for raising and lowering the receiving pen is similar to that described in my said patent No. 461,472. The reversing circuits $d$, $e$ are provided at the transmitting station with resistances R, R' and changes of strength in the reversing circuits effected by shunting in and out these resistances are used to operate the pen lifting mechanism of the receiver. The writing platen at the transmitting station is supported by an upwardly spring pressed plate 118 which is pivoted at 113, and has an extension beyond the pivot, 114, which carries the contact points 5 and 7, point 5 being in the normal (elevated) position of plate 118 in contact with the stop 4; but when the plate 118 is depressed by the pressure of the transmitting pen in writing it swings on its pivot so as to break contact between 4 and 5 and cause the contact point 7 on the upper side to come into contact with the stop 6. This movement of the plate 118 under the pressure of the transmitting pen shunts the current of circuit $e$ around the resistance R' and the current of the circuit $d$ through the resistance R. The current is thus increased upon the reversing circuit $e$ and decreased upon the reversing circuit $d$. In the circuits $d$ and $e$ respectively are placed at the receiving end of the line the two relays P, P'. The resistances R, R' are so adjusted with reference to the strength of the retracting springs for the armatures of these relays that these armatures are attracted only when the resistances are out of circuit. The effect, therefore of placing the transmitting pen upon the paper is to cause the relay P to release its armature and the relay P' to attract its armature and the effect of raising the pen from the paper will be to cause the relay P to attract its armature and the relay P' to release its armature. The receiving pen is raised and lowered by means of two magnets S, T placed one above the other and two local batteries $v$, $v'$. The armature 129 which carries the pen rest 130 is located between the two magnets S, T, and is operated by both of them. The circuit of the magnet S passes through battery $v$, armature 133 of relay P' and its back stop 134, wire $s$, contact spring 117, plate 52 and ground. The circuit of magnet T passes through battery $v'$, armature 132 of relay P, its back stop 128, wire $t$ and spring 116, plate 52 and thence to ground. When the transmitting pen is placed upon the paper the consequent decrease of current in the reversing circuit $d$ causes the magnet P to release its armature, the magnet T is therefore energized and at the same time the increased current in the reversing circuit $e$ and the attraction of the armature 133 by relay P' cause the circuit of magnet S to be broken. The armature 129 is thus depressed, carrying with it the pen lifter 130 and dropping the pen G to the paper. The pen G will remain in its depressed position until the transmitting pen is lifted from the paper and the operation is reversed.

My present invention includes improvements in the paper shifting mechanism and these will now be described. Referring particularly to Figs. 2, 3, 11, 12 and 13ª, it will be seen that the paper is positively fed and that the feeding rolls are driven directly from the main shaft 30. This shaft is provided with a pair of soft iron disks 55, similar to those above described in connection with the reversing mechanism, between which the shaft is of non-magnetic material, these pieces being embraced by the polar extensions of a magnet V similar to the magnets employed in the reversing mechanism. The armature 56 of the magnet V in this case is mounted so as to reciprocate horizontally being guided by a rear extension 57 passing through a hole in the post 58 and pivoted at its forward end to a lever 59 which in turn is pivotally mounted upon post 60 and is pushed toward magnet V by spring 61 which is fastened at one end to the lever 59 and at the other to an adjustable collar 62 whereby its tension may be regulated. The paper is drawn from a roll 63 over an idler 64 by two feeding rolls 65, 66. The upper feed roll is journaled in two arms 67, 68 fixed to and swinging upon shaft 69 journaled in the framework, the outer ends of the arms 67, 68 being held down by springs 70 whereby the upper roll is caused to press upon the lower. The journal of the roll 65 is prolonged through a slot 71 in the framework and carries gear wheel 72 which meshes with gear 73 keyed on the shaft of the lower roll 66. The shaft 69 is provided with a handle 74 and two projecting pieces 75 engaging with pins 76, 77 on the arms 67, 68 whereby by pressing down upon the handle 74 the roller 65 may be lifted and the paper released. Pivoted at 78 is a lever 79 carrying two spring pressed pawls 80, 81 adapted to engage with the teeth of the ratchet wheel 82 mounted on the shaft of the roll 66. The lower end of the lever 79 engages with a fork formed upon the end of the lever 59. The shaft and the disks 55 rotate in the direction of the arrow. When the magnet V is energized the armature 56 is caused to adhere to the disks and is driven to the left (Fig. 11), thus causing the lower end of arm 79 to move in the opposite direction. This movement is continued until the projection 83 carried by the armature opens the circuit of the magnet V as hereinafter explained and prevents further movement of the armature in a forward direction. The armature then recedes slowly, the circuit of magnet V is again made, and the armature rapidly vibrates through a small range of movement until the magnet V is again de-energized. The forward movement of the armature 56 is such as to cause the pawl 81 to rotate the drum 66 until the pawl 80 falls behind a tooth of the wheel 82, thus effecting an ordinary feed of the paper. The paper rolls are held in position by the pawl 80 until the next paper feed, and as the arm 56 recedes to its normal position it gives such movement to the pawl 80 as to rotate the roll 66 slightly and thereby maintain the tension upon the paper. The feeding rolls and gear wheels and other parts of the apparatus connected with them are commonly adjusted so that each energization of the magnet will cause the paper to be fed about the space usually left between two lines of writing. The circuit of magnet V passes from ground through battery $v$, armature 133 of relay P', front stop 135, wires $h$, $i$, circuit maker and breaker 136, wire $k$, coils of magnet V, wires $l$, $m$ and $p$, front stop 137 of relay P, armature 132, battery $v'$ to ground. Magnet V will therefore only be energized when both of the relays P, P' attract their armatures. This will only occur when there is a full current on both of the reversing circuits $d$, $e$. Provision is made for sending a full current to line on both of these circuits simultaneously by means of the so-called unison switch at the transmitting station. This switch does not differ substantially from some of those shown in my said former patents. It consists of an arm, 89, adapted to receive the pressure of the transmitting pen and fixed upon a vertical shaft 90, carrying two metal triangular lugs 91, 92, for each of which is provided a pair of springs 119, 120 and 121, 122. Springs 119, and 121 are connected respectively to the circuit wires $d$, $e$; and springs 120 and 122 are connected by wires $a$, $a'$, respectively, with batteries Z, Z' respectively. Lugs 91, 92 are respectively connected to wires $d$, $e$ which run thence to the pen switch and thence to line. The shaft 90 is normally held by a retractile against a stop pin in the position wherein the circuits $d$, $e$, are made respectively through the springs 121, 119. When the operator desires to operate the unison or paper shifting mechanism at the distant station he moves his transmitting pen to the switch arm and rotates the latter until the circuits $d$, $e$ are broken through springs 119, 121, and closed through springs 120, 122. Current now passes to line wires $d$, $e$ from batteries Z Z' respectively, over wires $a$, $a'$ respectively. These currents are of full strength, since they are both independent of resistances R, R', and therefore cause both of the relays, P, P', at the receiving station, to attract their armatures, thereby closing the circuit of magnet V and shifting the paper. Some of the advantages of this form of paper feed mechanism are that it derives the power for feeding the paper from the motor which operates the receiving pen; that it insures a certain definite feed of the paper for each operation of the paper shifting switch whether the switch be held in the paper shifting position a relatively short or long length of time; that the length of the feed is independent of the amount of paper on the roll and is therefore uniform; that the mechanism is definite and positive in its action, and that these results are accomplished by the use of very simple apparatus.

The movements for bringing the receiving instrument to unison with the transmitting instrument are substantially the same as have been shown in my said patent No. 461,472, consisting of magnets O, O', each of which is provided with a pivoted armature lever 54 forked at its end and embracing a collar 50, as before stated. Each of the magnets O, O' is in a branch of the circuit of magnet V through the wires respectively $o$, $o'$. These magnets are therefore only energized when the relays P, P' attract their armatures simultaneously, and this occurs when, and only when, the operator moves the paper shifting and unison switch 101. When energized, the two magnets O, O' attract their armatures and depress the collars 50 (see Fig. 9) against the pressure of springs 49, causing the clutch 47, 48 to open, and disconnecting the pen drums 94 from the escapement wheel. Each pen drum is therefore left free to revolve under the influence of that one of the magnets X, Y or X', Y' which is operative at the time, and the pen will therefore be suddenly driven in the direction of the movement given to it by the operation of that magnet and will move to the limit of its motion in that direction. Both of the pen drums 94 being simultaneously freed from restraint in this manner the receiving pen will spring forward in both directions. The connections of the wires $a$, $a'$ with the batteries Z, Z' are such that the currents sent over the reversing circuits $d$, $e$ respectively upon the operation of the paper shifting and unison switch are normal for that position of the transmitter, and cause a tendency of the receiving pen to move toward a position corresponding to that of the transmitting pen, while the latter is operating upon the switch lever 101; that is, as the instrument is usually organized toward a position near the upper left hand corner of the receiving field. At this point it will be arrested by stops 84, 85, one of these stops being fixed upon each of the guide rods 36 and adapted to come in contact with lugs 86, 87 on the armatures 34, 35. It will therefore result that if the receiving pen is in advance of the transmitting pen it will be overtaken at its extreme point of motion by the transmitting pen at the moment of shifting the paper; and if the receiving pen is behind the transmitting pen it will overtake the latter at the same point.

The circuit of the motor 95 is normally closed when the instrument is in operation through battery $u$, wires $u'$, spring 88 and plate 52. Plate 52 operates in connection with the contact springs which bear upon it as a cut out to prevent waste of battery force when the instrument is not in operation, and operates in a similar manner to the cut out described in my said patent No. 461,472. Two magnets L, L' are provided, one in the circuit $d$ and the other in the circuit $e$. These magnets have a common armature 97 having an armature lever 98 pivoted so as to swing in two directions. The lever 98 carries a block 102 upon which is mounted the plate 52, insulated from the lever 98. The lever 98 has a downwardly projecting pin 103 which engages with the thread of a screw 108 mounted upon the shaft 30, this engagement being made only when the armature 197 is in its elevated position. A spring 106 draws the armature lever 98 to the left until it comes in contact with the collar 107, in which position all of the springs 51, 117, 116 and 88 are in contact with the metallic plate 52. This position will be taken by the armature lever 98 whenever there is a current on either of the reversing circuits $d$, $e$, since the attraction of either of the magnets L, L' is sufficient to hold the pin 103 out of engagement with the screw 108 and all the local circuits at the receiving station will be complete through the springs bearing on the plate 52. When, however, the instrument is thrown out of operation, and no current traverses either of the reversing circuits $d$, $e$, the armature 97 will be released, the pin 103 will engage with the screw 108, and the armature lever 98 will be moved to the right until the contact springs drop off from the plate 52 to the block 102 of insulating material, thereby breaking their respective circuits. The spring 88 which controls the motor is preferably placed so that it is the last to leave plate 52. When, therefore, the effective current is taken off both of the lines $d$, $e$ the several local circuits at the transmitting station, and finally the motor circuit itself, will, after a few revolutions of the motor shaft, be interrupted. The springs bearing upon the plate 52 are so adjusted with reference to it that these circuits will not be broken in bringing the transmitting and receiving pens to unison, or in shifting the paper under ordinary circumstances, or, in other words, the unison point will be reached and the paper shifted before the springs are carried off from the plates 52 to the insulating portion of the block 102.

The apparatus has been thus far described as including only one instrument at the transmitting station and a receiving instrument at the distant station. It is of course contemplated that each station will possess both a transmitting and a receiving instrument, and that the line wires may be shifted from one to the other by means of a pen rack switch, as described in my prior patents. Such an arrangement is shown in Fig. 13, the swinging of the contact pieces 109, 110, 111 and 112 connected with the pen rack switch, serving to shift line wires $b$, $c$, $d$, $e$ from the transmitting instrument to the wires $b'$, $c'$, $d'$, $e'$ leading to the receiving instrument at the same station. The pen rack switch itself is of the same general construction as the unison switch, and does not require further description.

In the modification of the reversing clutch shown in Figs. 17 and 18 the magnets $X'$, $Y'$ are made in the form of spools surrounding the shaft 30 itself. In each of these magnets spool 123 which supports the wire of the coil is hollow and is placed concentrically with the shaft 30 but does not revolve therewith. It is supported by a collar 124 fastened upon a post 126. Fitted to and adapted to revolve within the spool 123 is a soft iron core 125 fixed rigidly upon the shaft and carrying upon its ends soft iron disks 127. The armature 128, to which the cord running to the pen drum is attached, bears against the peripheries of the two disks 127. The operation of this device is the same as that of the mechanism already described. Of course an equivalent construction would be to mount the coil upon the core 125 and provide the usual means for conducting the currents from the moving wires of the coil to the fixed circuit wires.

In the modifications shown in Figs. 19 and 20 the disks 138 are connected by a soft iron sleeve 139 and are rigid with the shaft. The vertically sliding member of the clutch is in this case the core piece itself, 140, of the magnet. In this form the magnets may move with the core piece or may be fixed, the core piece moving through them, as shown in Figs. 19, 20 wherein the magnets $X'$, $Y'$ are attached to the supporting pieces 141 and their spools have openings through which the core pieces 140 reciprocate.

While I have shown the parts of the apparatus which constitute the principal portions of my present invention as associated with the particular forms of the other parts of the apparatus which are shown in the drawings and described in the specification herein, it is to be understood that I do not limit myself to their use in such connection but intend to claim each novel feature both when used in connection with other devices such as herein described and shown, and when used in connection with any other mechanism with which they are operative.

While I prefer an electric motor as a source of power for driving the receiving pen, in that it is more readily controlled from the transmitting station than other forms of prime motors, I do not limit myself to the use of such a motor, but may employ in its stead any convenient type of mechanical motor, or a weight or shaft rotated from any appropriate source of power.

The term "motor" or "power mechanism" as used herein is intended to include any and every device from which power may be derived. It is obvious that, if preferred, two motors may be used for operating the receiving pen, one governed by pulsations transmitted over each circuit.

It is to be understood that in this application, as in my former patents, the terms "character," "writing" and "message" as herein used include any matter—such as pictures, maps, drawings, diagrams and arbitrary characters of all kinds, as well as ordinary and short hand writing; also that the term "paper" includes any surface suitable for writing or from which any writing or printing is to be traced. If in addition to transmitting messages in writing it should be desired to capacitate the mechanism to reproduce maps, diagrams and pictures, all that is necessary is to allow the transmitting and receiving pens to have the necessary range of movement in each direction.

In some cases it may be preferred to write the message in the form of a single line extending along the length of a narrow ribbon of paper, as suggested in my former patents, and in such cases it would only be necessary to arrange the mechanism for shifting the paper in the direction of a line of writing, instead of in a direction perpendicular thereto.

The receiving pen may, if desired, consist of a simple pencil or tracer and the ink supplying apparatus be dispensed with.

As stated in my prior patents Nos. 386,814 and 386,815 the movements necessary to reproduce the message instead of being imparted to the receiving pen may be wholly or in part imparted to the paper. It is therefore to be understood that whenever the movement of the receiving pen is referred to as forming the characters, that this also includes the equivalent movement of the paper, and that a recording surface movable for the purpose of forming characters is for the purposes of this application the equivalent of a movable pen.

Of course it will be understood that no particular form of interrupter is essential for the practice of my present invention. I intend to include under that term every device by means of which electric pulsations, whether successively of the same or opposite polarity, may be produced in a circuit.

I do not intend to limit myself in any of my claims to the same construction of apparatus as that herein shown and described, but I intend to include within my claims every device and contrivance whatsoever substantially equivalent in this art to the several structures or the constituent elements thereof, herein claimed.

What I claim is:—

1. The combination of a motor, a telautographic receiving pen driven thereby, and a magnetic clutch through which the power of the motor is transmitted to the driven mechanism, said clutch consisting of two members each of magnetizable material, one having a rotatory and the other a rectilinear motion, substantially as set forth.

2. The combination of a telautographic receiving pen, a motor or other power mechanism for driving the receiving pen, and a magnetic clutch for transmitting power from the motor to the pen, said clutch consisting of two members, each of magnetizable material, one caused to rotate by the power mechanism and the other receiving a rectilinear movement therefrom, substantially as described.

3. As a means for controlling the application of power, a disk or disks of magnetizable material mounted upon the power shaft, a plate or bar of like material located in proximity thereto and having a sliding motion on guides and means for magnetically exciting the disk and plate when it is desired to transmit power, substantially as described.

4. As a means for controlling the application of power, a disk or disks of magnetizable material mounted upon the power shaft, a plate or bar of like material located in proximity and tangentially to the disk and receiving motion therefrom, and means for magnetically exciting the disk and plate when it is desired to transmit power, substantially as described.

5. As a means for transmitting power, a rotating disk or disks of magnetizable material and a plate or bar of like material having a sliding motion on guides, and a reciprocating plate or bar of like material, in such magnetic condition that they are attracted to each other and the one caused to move by movement of the other, substantially as described.

6. The combination of a telautographic transmitting pen, a receiving pen, a motor or other power mechanism for driving the receiving pen, power transmitting mechanism for conveying power to the receiving pen, consisting in part of a magnetic clutch one member of which is a disk of magnetizable material rotated by the power mechanism, and the other member is a plate or bar of like material located in proximity to the exterior of the disk and connected with the receiving pen, and means operated through the movement of the transmitting pen for magnetically exciting said disk and plate to cause movement of the receiving pen, substantially as described.

7. As a means for transmitting power to drive the drum of a receiving pen alternately in opposite directions, two pairs of rotating disks of magnetizable material, two reciprocating plates or bars of like material, one placed in proximity to each pair of disks, connections between the plates and drum whereby the plates may be caused to drive the drum respectively in opposite directions, and means for alternately exciting each pair of disks to cause the power to be transmitted through the corresponding plate substantially as described.

8. The combination of a telautographic transmitting pen, a receiving pen, a motor or other power mechanism for driving the receiving pen, power transmitting mechanism for conveying power to the receiving pen consisting in part of two magnetic clutches, one member of each of which is a pair of magnetizable disks rotated from the source of power, and the other member a magnetizable reciprocating plate or bar located in proximity to the pair of disks and connected to the receiving pen, and means operated through the movement of the transmitting pen for alternately magnetically exciting each pair of disks and its plate for causing the direction of movement of the receiving pen to be reversed in accordance with reversal in direction of movement of the transmitting pen, substantially as described.

9. The combination of a telautographic transmitting pen at a transmitting station, a receiving pen at a receiving station, electrical connections between the two stations, mechanism for driving the receiving pen, a part of said mechanism consisting of a magnetic clutch provided with a rotating disk or disks and a reciprocating plate or bar both of magnetizable material, a magnet for controlling the magnetic condition of said clutch, and means whereby the electrical condition of said magnet is controlled from the transmitting station and the movements of the receiving pen thereby effected, substantially as described.

10. The combination of a motor or other power mechanism, a telautographic receiving pen or other mechanism driven thereby, and a magnetic clutch through which the power of the motor is transmitted to the driven mechanism said clutch consisting of two members, each of magnetizable material, one having a rotatory motion and the other reciprocating in the plane of rotatory motion and in a direction perpendicular to a radius of the rotatory member, substantially as described.

11. The combination of a telautographic receiving pen, a motor or other power mechanism for driving the receiving pen, a reversing mechanism consisting of two magnetically controlled clutches one or the other of which is put into operation according to the direction of motion desired for the receiving pen, and an additional mechanism for regulating and limiting the amount of power transmitted to the receiving pen, substantially as described.

12. The combination of a telautographic receiving pen, a motor or other source of power for driving the receiving pen, a reversing mechanism for reversing the direction of movement imparted to the receiving pen to follow similar changes in the movement of the transmitting pen, and additional mechanism for regulating and limiting the amount of power transmitted to the receiving pen, substantially as described.

13. The combination of a telautographic receiving pen, a motor or other power mechanism for driving it, and a frictional power regulator between the power mechanism and the receiving pen, substantially as set forth.

14. The combination of a telautographic receiving pen, a motor or other source of power for putting the same under tension to move in a given direction, an escapement for holding the receiving pen in restraint as against said tension, and a mechanically acting friction clutch for limiting the amount of power applied to the receiving pen, substantially as described.

15. The combination of a telautographic receiving pen, a motor or other source of power for putting the same under tension to move in a given direction, an escapement for holding the receiving pen in restraint as against said tension, and a frictional power regulator for regulating the amount of power applied to the receiving pen, substantially as described.

16. The combination of a telautographic receiving pen, a motor or other power mechanism for driving the same, and a regulator for regulating the amount of power applied to the receiving pen consisting of two surfaces in frictional contact, by means of the friction between which the power is transmitted, substantially as described.

17. In combination with a receiving pen and a motor or other power mechanism for driving the same, a power regulator the members of which are a plate and cushion in frictional contact, one of said members being driven from the power mechanism and the other connected to the receiving pen to drive the same, and means for holding the plate and cushion one against the other, so that the power is transmitted to the receiving pen by reason of said friction, substantially as described.

18. The combination of a telautographic transmitting pen at a transmitting station, a receiving pen at a receiving station, electrical connections between the two stations, a motor for driving the receiving pen, means operated through the transmitting pen for sending electrical impulses to line to control the movement of the receiving pen, and two frictional power regulators, one for each of two crosswise directions of movement of the receiving pen, whereby a uniform and precisely adjusted application of power to the receiving pen is secured, substantially as described.

19. In a telautograph, the combination of a motor or other source of power, a paper feeding mechanism driven thereby, a magnetic clutch for transmitting the power of the motor to the feed mechanism, said clutch consisting of two pieces of magnetizable material receiving motion one from the other when magnetically excited, and means for controlling the magnetic condition of the clutch, and thereby the feed of the paper, substantially as described.

20. The combination of a telautographic receiving pen, a motor or other power mechanism for driving the same, a paper feeding mechanism, and a magnetically controlled clutch through which the power of the power mechanism is transmitted to the paper feeding mechanism, said clutch having two members each of magnetizable material, one member receiving motion from the other by reason of their mutual magnetic attraction, substantially as described.

21. The combination of a telautographic receiving pen, a motor or other power mechanism for driving the same, a magnetic clutch for transmitting power from the power mechanism to the paper feeding mechanism, said clutch consisting of two members, each of magnetizable material, one member being rotated by the power mechanism and the other receiving motion therefrom, and means for controlling the magnetic condition of the clutch from the distant station, and thereby the feed of the paper, substantially as described.

22. The combination in a telautograph of a paper shifting mechanism, an electro magnet for controlling the operation thereof, and a circuit breaker for breaking the magnet circuit when the paper shifter has moved sufficiently, the same being operated automatically by the paper shifting mechanism at its extreme point of movement, substantially as described.

In testimony whereof I have hereunto set my hand in the presence of two subscribing witnesses.

ELISHA GRAY.

Witnesses:
M. B. PHILIPP,
T. F. KEHOE.